(12) United States Patent
Xu et al.

(10) Patent No.: US 11,475,219 B2
(45) Date of Patent: Oct. 18, 2022

(54) METHOD FOR PROCESSING INFORMATION, AND STORAGE MEDIUM

(71) Applicant: Beijing Xiaomi Pinecone Electronics Co., Ltd., Beijing (CN)

(72) Inventors: Zeyu Xu, Beijing (CN); Xiongwen Deng, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 324 days.

(21) Appl. No.: 16/942,087

(22) Filed: Jul. 29, 2020

(65) Prior Publication Data

US 2021/0224479 A1 Jul. 22, 2021

(30) Foreign Application Priority Data

Jan. 19, 2020 (CN) .......................... 202010059203.3

(51) Int. Cl.
*G06F 40/279* (2020.01)
*G06F 40/30* (2020.01)
*G06N 3/04* (2006.01)
*G06N 3/08* (2006.01)

(52) U.S. Cl.
CPC ............ *G06F 40/279* (2020.01); *G06F 40/30* (2020.01); *G06N 3/0445* (2013.01); *G06N 3/0454* (2013.01); *G06N 3/08* (2013.01)

(58) Field of Classification Search
CPC ..... G06F 40/279; G06F 40/30; G06N 3/0445; G06N 3/0454; G06N 3/08
See application file for complete search history.

(56) References Cited

U.S. PATENT DOCUMENTS

| 8,630,847 B2 * | 1/2014 | Tang | ..................... G06F 40/284 704/7 |
| 2013/0124206 A1 * | 5/2013 | Rezvani | ............ H04M 1/72439 704/270 |

(Continued)

FOREIGN PATENT DOCUMENTS

| JP | 2018081298 A | 5/2018 |
| JP | 2019533259 A | 11/2019 |

(Continued)

OTHER PUBLICATIONS

Supplementary European Search Report in European Application No. 20188312.1, dated Nov. 3, 2020.

(Continued)

*Primary Examiner* — Akwasi M Sarpong
(74) *Attorney, Agent, or Firm* — Finnegan, Henderson, Farabow, Garrett & Dunner, L.L.P.

(57) ABSTRACT

A method for processing information, includes: performing word segmentation on first corpus data to obtain second corpus data containing at least one word; processing, based on a first pretrained model, the at least one word contained in the second corpus data, to obtain a first eigenvector sequence corresponding to the second corpus data; processing, based on a second pretrained model, characters contained in the first corpus data, to obtain a second eigenvector sequence corresponding to the first corpus data; and obtaining a target eigenvector based on the first eigenvector sequence and the second eigenvector sequence.

12 Claims, 6 Drawing Sheets

(56) References Cited

U.S. PATENT DOCUMENTS

| | | | |
|---|---|---|---|
| 2015/0149461 A1* | 5/2015 | Aguilar Lemarroy | G06F 16/35 707/737 |
| 2018/0025303 A1* | 1/2018 | Janz | G16H 50/20 705/2 |
| 2018/0165554 A1* | 6/2018 | Zhang | G06K 9/6256 |
| 2020/0293720 A1* | 9/2020 | Tu | G06F 40/289 |
| 2020/0380949 A1* | 12/2020 | Wu | G06N 3/0454 |

FOREIGN PATENT DOCUMENTS

| | | |
|---|---|---|
| KR | 20180055189 A | 5/2018 |
| WO | WO 2019082362 A1 | 5/2019 |
| WO | WO 2019149200 A1 | 8/2019 |

OTHER PUBLICATIONS

Ashish Vaswani et al., "Attention Is All You Need" arXiv:1706.03762v5 [cs. CL], Dec. 6, 2017, 31st Conference on Neural Information Processing Systems (NIPS 2017), Long Beach, CA, USA.

Jacob Devlin et al., "BERT: Pre-training of Deep Bidirectional Transformers for Language Understanding" arXiv: 1810.04805v2 [cs. CL], May 24, 2019.

Notice of Reasons for Refusal of Japanese Application No. 2020-130420, dated Sep. 29, 2021.

Notice of Submission of Opinion of Korean Application No. 10-2020-0095607, dated Jun. 17, 2022.

* cited by examiner

METHOD FOR PROCESSING INFORMATION, AND STORAGE MEDIUM

CROSS-REFERENCE TO RELATED APPLICATION

The present application is based on and claims priority to Chinese Patent Application No. 202010059203.3 filed on Jan. 19, 2020, the entire content of which is incorporated herein by reference.

TECHNICAL FIELD

The disclosure relates to the field of computer communication, and particularly to a method for processing information, and a storage medium.

BACKGROUND

The Internet has been developing quickly since the 1990s, and entered an age of bigdata now. Massive information and data are held on the Internet, including text, audio, images, video, etc. Text may include media news, technology documents, reports, E-mails, technical patents, books, etc. Compared with image and audio data, text occupies less network resources and is easier to upload and download. Therefore, most information exists in the form of text in network resources. How to effectively organize and manage the text information and to find out text information desired by a user quickly, accurately and comprehensively is a great challenge that the information science and technology is facing.

Conventional text classification is mainly based on knowledge engineering, and text is classified by manually defining some rules. This is arduous and time-consuming, and enough knowledge in a field is needed to refine appropriate rules. Moreover, the precision of classification may be reduced if there are not enough training samples.

SUMMARY

According to a first aspect of embodiments of the disclosure, a method for processing information, includes: performing word segmentation on first corpus data to obtain second corpus data containing at least one word; processing, based on a first pretrained model, the at least one word contained in the second corpus data, to obtain a first eigenvector sequence corresponding to the second corpus data; processing, based on a second pretrained model, characters contained in the first corpus data, to obtain a second eigenvector sequence corresponding to the first corpus data; and obtaining a target eigenvector based on the first eigenvector sequence and the second eigenvector sequence.

According to a second aspect of embodiments of the disclosure, a device for processing information, includes: a processor, and a memory for storing instructions executed by the processor, wherein the processor is configured to: perform word segmentation on first corpus data to obtain second corpus data containing at least one word; process, based on a first pretrained model, the at least one word contained in the second corpus data, to obtain a first eigenvector sequence corresponding to the second corpus data; process, based on a second pretrained model, characters contained in the first corpus data, to obtain a second eigenvector sequence corresponding to the first corpus data; and obtain a target eigenvector based on the first eigenvector sequence and the second eigenvector sequence.

According to a third aspect of embodiments of the disclosure, a non-transitory computer-readable storage medium has stored therein instructions that, when executed by a processor of a device, cause the device to perform the method for processing information according to the first aspect.

It is to be understood that the general description above and detailed description later are merely exemplary and explanatory, and are not intended to limit the disclosure.

BRIEF DESCRIPTION OF THE DRAWINGS

The accompanying drawings, which are incorporated into the specification and constitute part of the specification, illustrate embodiments consistent with the disclosure and explain the principles of the disclosure together with the specification.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. Implementations described in the following exemplary embodiments do not represent all the implementations consistent with the disclosure. On the contrary, they are merely examples of apparatuses and methods consistent with some aspects of the disclosure as recited in the appended claims.

Figure 1:
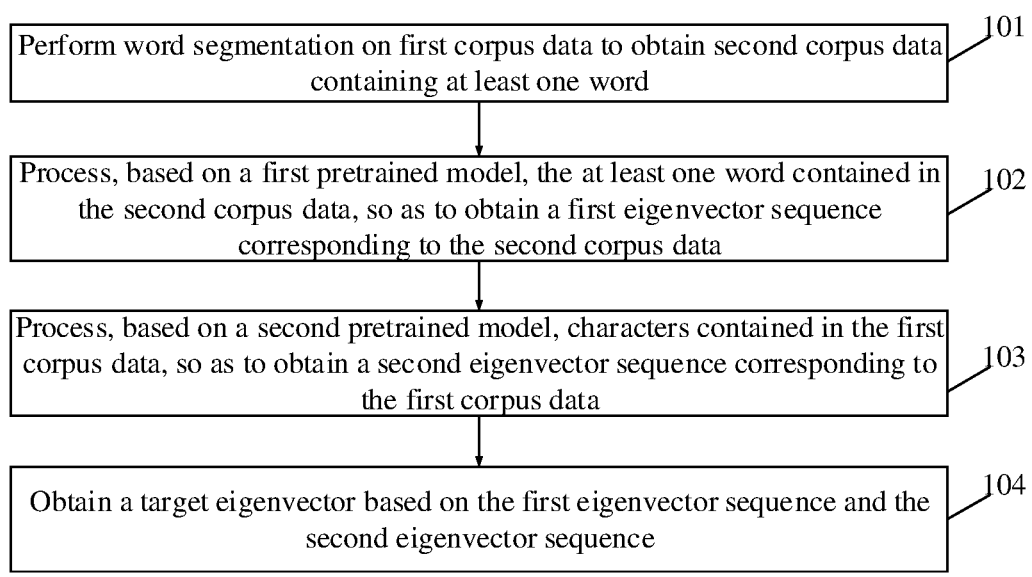
FIG. 1 illustrates a flowchart of a method for processing information according to an exemplary embodiment.

FIG. 1 illustrates a flowchart of a method for processing information according to an exemplary embodiment. As illustrated in FIG. 1, the method includes the following steps.

In step 101, word segmentation is performed on first corpus data to obtain second corpus data containing at least one word.

In step 102, the at least one word contained in the second corpus data is processed based on a first pretrained model, to obtain a first eigenvector sequence corresponding to the second corpus data.

In step 103, one or more characters contained in the first corpus data are processed based on a second pretrained model, to obtain a second eigenvector sequence corresponding to the first corpus data.

In step 104, a target eigenvector is obtained based on the first eigenvector sequence and the second eigenvector sequence.

The first corpus data may be corpus data in a set language. For example, the first corpus data may be corpus data based on Chinese.

With the first corpus data being corpus data based on Chinese as an example, before processing the first corpus data based on the first pretrained model, word segmentation may to be performed on the first corpus data to obtain second corpus data containing at least one word. Then the second corpus data containing the at least one word is processed based on the first pretrained model.

In embodiments of the disclosure, word segmentation may be performed, based on a set word segmentation algorithm, on the first corpus data to obtain the second corpus data expressed based on words. The set word segmentation algorithm includes at least one of: a string matching based word segmentation algorithm, an understanding-based word segmentation algorithm, and a statistics based word segmentation algorithm.

For example, in the string matching based word segmentation algorithm, a string to be segmented is matched with words in a set machine dictionary according to a set strategy, to find, in the dictionary, a word corresponding to a substring of the string, to obtain a word segmentation result. For example, the first corpus data contains Chinese characters "今 天天气真好". If the set machine dictionary contains Chinese words "今天", "天气", "真好", the result of word segmentation on the first corpus data, namely the second corpus data is "今 天 天气 真好".

In the understanding-based word segmentation algorithm, word segmentation is performed by using a computer to simulate a human's understanding of a sentence. For example, syntactic and semantic analysis are performed while performing word segmentation, and ambiguity is resolved using syntactic information and semantic information. For example, an understanding-based word segmentation algorithm is obtained by training a model based on a large amount of data collected, then the first corpus data to be segmented is input into the understanding-based word segmentation algorithm, to obtain and output a word segmentation result. The second corpus data is formed based on the word segmentation result.

In the statistics based word segmentation algorithm, the probabilities of co-occurrence of characters and of words are used as a basis for word segmentation. The statistics based word segmentation algorithm is a word segmentation algorithm without a dictionary. Statistics needs to be made for each character set in the first corpus data, and the probability of each character occurring to be adjacent with another character in the character set is calculated. The probability of each character occurring to be adjacent with another character in the character set is compared to a set probability threshold. When the probability of the character occurring to be adjacent to the another character in the character set is greater than the set probability threshold, it is determined that the character set may constitute a word.

After performing word segmentation on the first corpus data based on the set word segmentation algorithm, second corpus data containing at least one word may be obtained. At this time, the at least one word contained in the second corpus data may be processed based on a first pretrained model, to obtain a first eigenvector sequence corresponding to the second corpus data.

In an embodiment, the first pretrained model includes at least one of: a FastText model, a Word to Vector (Word2vec) model, and a Continuous Bag-Of-Words (CBOW) model. The first eigenvector sequence contains at least one eigenvector.

With the first pretrained model being a FastText model as an example, the second corpus data containing the at least one word may be input to a pretrained FastText model. The FastText model converts each word contained in the second corpus data into a corresponding word vector, and arranges all of the word vectors obtained by conversion according to an order corresponding to the order of the words in the second corpus data, so as to form a word vector sequence corresponding to the second corpus data.

With the second pretrained model being a Bidirectional Encoder Representations from Transformers (BERT) model as an example, the first corpus data may be directly input to a pretrained BERT model, the BERT model converts each character contained in the first corpus data into a corresponding character vector, and arranges all of the character vectors obtained by conversion according to an order corresponding to the order of the characters in the first corpus data, so as to form a character vector sequence corresponding to the first corpus data.

In embodiments of the disclosure, corpus data is characterized by vectors based on words and characters respectively, and splicing processing is performed on the first eigenvector sequence obtained based on words and the second eigenvector sequence obtained based on characters, to obtain a target eigenvector. Since the target eigenvector obtained by splicing processing contains features obtained based on characters and features obtained based on words, multiple types of features can be fused, so that training samples acquired for classification are more abundant, and the precision and the effect of generalization of a model obtained by training are significantly improved.

In some embodiments, each of the first eigenvector sequence and the second eigenvector sequence contains at least one eigenvector, and obtaining the target eigenvector based on the first eigenvector sequence and the second eigenvector sequence includes: processing, based on a convolutional neural network model, the first eigenvector sequence, to extract a first eigenvector from the first eigenvector sequence; processing, based on a long short-term memory model, the first eigenvector sequence, to extract a second eigenvector from the first eigenvector sequence; processing, based on the second pretrained model, the second eigenvector sequence, to extract a third eigenvector from the second eigenvector sequence; and obtaining the target eigenvector based on the first eigenvector, the second eigenvector, and the third eigenvector.

In an embodiment, after the first eigenvector sequence is input into a convolutional neural network, convolution calculation may be performed on eigenvectors in the first eigenvector sequence based on a convolution kernel of the convolutional neural network, so as to extract a first eigenvector. After convolution calculation is performed, based on the convolution kernel, on an eigenvector of an area in the first eigenvector sequence having a same size as the convolution kernel, another area is moved to, so as to continue calculation until each eigenvector in the first eigenvector sequence is covered. As such, a first eigenvector may be extracted from the first eigenvector sequence through a set kernel. While extracting the first eigenvector based on the convolutional neural network, the first eigenvector sequence is also processed based on a long short-term memory (LSTM) model to extract a second eigenvector from the first eigenvector sequence, and the second eigenvector sequence is processed based on the BERT model to extract a third eigenvector from the second eigenvector sequence.

Each eigenvector contained in the first eigenvector sequence may contain word information corresponding to each word in the second corpus data. In the process of performing feature extraction on the first eigenvector sequence based on the convolutional neural network model and the LSTM model, an eigenvector containing a largest amount of information may be extracted from the first eigenvector sequence respectively to serve as the first eigenvector and the second eigenvector. For example, the eigenvector containing the largest amount of information may be obtained by performing max-pooling based on a pooling layer of the convolutional neural network. In the process of performing feature extraction on the second eigenvector sequence based on the BERT model, an eigenvector containing a largest amount of information may also be extracted from the second eigenvector sequence based on the BERT model to serve as the third eigenvector, or an eigenvector at a set position in the second eigenvector sequence may be extracted directly to serve as the third eigenvector. For example, the first eigenvector in the second eigenvector sequence may be taken as the third eigenvector.

In an embodiment, the first and second eigenvectors are extracted from the first eigenvector sequence based on the neural network model and the long short-term memory model, and the third eigenvector is extracted from the second eigenvector sequence based on the second pretrained model. Features of characters and words may be fused. By extracting feature information of words based on the neural network model and the long short-term memory and extracting feature information of characters based on the second pretrained model, the amount of information for use in classification can be increased by fusion of the two types of information and fusion of the multiple models.

In some embodiments, obtaining the target eigenvector by splicing the first eigenvector, the second eigenvector, and the third eigenvector includes: splicing the second eigenvector to a tail of the first eigenvector, and splicing the third eigenvector to a tail of the second eigenvector which has been spliced to the tail of the first eigenvector, to obtain a spliced eigenvector; and performing dimensionality reduction on the spliced eigenvector to obtain the target eigenvector.

In an embodiment, the first eigenvector, the second eigenvector, and the third eigenvector may be spliced based on a method concat( ) to obtain a spliced eigenvector. The first eigenvector, the second eigenvector, and the third eigenvector would not be changed by the method concat( ), instead only a copy of the first eigenvector, the second eigenvector, and the third eigenvector which are connected will be returned. When the dimensionality of the spliced eigenvector is high, dimensionality reduction needs to be performed on the spliced eigenvector to obtain the target eigenvector. The dimensionality reduction is used for densifying a high-dimension array to be a low-dimension array.

For example, if the obtained first eigenvector contains 200 dimensions, the obtained second eigenvector contains 200 dimensions, and the obtained third eigenvector contains 300 dimensions, the spliced eigenvector obtained by splicing the first eigenvector, the second eigenvector and the third eigenvector directly according to a set order contains 700 dimensions. The second eigenvector may be spliced to the tail of the first eigenvector, and the third eigenvector may be spliced to the tail of the second eigenvector, to obtain the spliced eigenvector. After the splicing processing, dimensionality reduction may be performed on the spliced eigenvector to output the target eigenvector. For example, dimensionality reduction may be performed on the spliced eigenvector based on a set dimensionality reduction algorithm. The set dimensionality reduction algorithm includes at least one of: a Linear Dimensionality Reduction algorithm, a Principal Component Analysis (PCA) algorithm, a Multidimensional Scaling (MDS) algorithm, a Linear Discriminant Analysis (LDA) algorithm, a Locally Linear Embedding (LLE) algorithm.

With performing linear dimensionality reduction on the spliced eigenvector based on a linear dimensionality reduction algorithm as an example, linear transformation may be performed on the spliced eigenvector, and the spliced eigenvector is mapped to and expressed in a space having less dimensions than the spliced eigenvector. For example, if it is determined that the spliced eigenvector X contains d dimensions, a linear transformation formula may be used to perform dimensionality reduction on the spliced eigenvector X with d dimensions to obtain the target eigenvector X' with d' dimensions, where d'<d. The features in the obtained target eigenvector X' are linear combinations of the features in the spliced eigenvector X. The linear transformation formula is:

$$X' = W^T X \qquad (1)$$

where W is a transformation matrix, X is the spliced eigenvector, X' is the target eigenvector. The transformation matrix W may be considered as d' base vectors, each base vector having d dimensions.

In some embodiments, each of the at least one word contained in the second corpus data has a word identification (ID), and processing, based on the first pretrained model, the at least one word contained in the second corpus data, to obtain the first eigenvector sequence corresponding to the second corpus data includes: determining the word ID of each of the at least one word contained in the second corpus data; querying, based on the word ID of each of the at least one word, a set word-vector mapping table of the first pretrained model, to determine, from the set word-vector mapping table, an eigenvector for each of the at least one word, with the set word-vector mapping table containing a mapping relationship of the word ID of each of the at least one word with the respective eigenvector; and arranging the determined eigenvectors for all of the at least one word in a first set order, to obtain the first eigenvector sequence.

In an embodiment, after obtaining the first pretrained model by training, a set word-vector mapping table of the first pretrained model may be obtained. The set word-vector mapping table contains a mapping relationship of the word ID of each of the at least one word with the respective eigenvector. In embodiments of the disclosure, the word ID of each word contained in the second corpus data may be determined first, and a set word-vector mapping table may be queried based on the word ID of each word, to determine an eigenvector for each word. The word ID may be a serial number labelled for each word. After determining the eigenvector for each word in the second corpus data, the eigenvectors for all of the words may be arranged in a first set order, to obtain the first eigenvector sequence. Here, the first set order may be determined according to the order of the words arranged in the second corpus data. When the first pretrained model is a FastText model, eigenvectors in the first eigenvector sequence obtained based on the FastText model are static word vectors. Context information is fused in the static word vectors, thus having a good effect of local feature extraction.

In some embodiments, each of the characters contained in the first corpus data has a character identification (ID), and processing, based on the second pretrained model, the characters contained in the first corpus data, to obtain the second eigenvector sequence corresponding to the first corpus data includes: determining a character ID of each of the characters contained in the first corpus data; analyzing, based on the second pretrained model, a context of each of the characters contained in the first corpus data, to obtain an analysis result; querying, based on the analysis result for contexts of the characters and character IDs of the characters, a set character-vector mapping table of the second pretrained model, to determine, from the set character-vector mapping table, an eigenvector for each of the characters, with the set character-vector mapping table containing a mapping relationship of the character IDs of the characters with the respective eigenvectors; and arranging the determined eigenvectors for the characters in a second order, to obtain the second eigenvector sequence.

In an embodiment, after obtaining the second pretrained model by training, a set character-vector mapping table of the second pretrained model may be obtained. The set character-vector mapping table contains a mapping relationship of the character IDs of the characters with the respective eigenvectors. In embodiments of the disclosure, a context of each of the characters contained in the first corpus data may be analyzed based on the second pretrained model first, to obtain an analysis result, and a set character-vector mapping table of the second pretrained model may be queried based on the analysis result for contexts of the characters and character IDs of the characters, to determine, from the set character-vector mapping table, an eigenvector for each of the characters. The context of each character may be characters adjacent to the character. For example, the preceding text of the $m^{th}$ character may be the $(m-x)^{th}$ character, and the following text of the $m^{th}$ character may be the $(m+x)^{th}$ character, where m and x are both positive integers. For example, when the first corpus data is "今天天 气真好", "今", the first "天" and the second "天" are all the preceding context of "气", and "真" and "好" are the following context of "气".

After determining the eigenvector for each character in the first corpus data, the eigenvectors for all of the characters may be arranged in a second set order, to obtain the second eigenvector sequence. For example, the second set order may be determined according to the order of the characters arranged in the first corpus data. When the second pretrained model is a BERT model, context of each character in the first corpus data is analyzed based on the BERT model, to obtain the context of the first corpus data. A real meaning, such as semanteme, of each character in the first corpus data is determined according to the context of the first corpus data. A corresponding set character-vector mapping table is determined according to the real semanteme of each character, and a character vector corresponding to each character is determined from the corresponding set character-vector mapping table. For example, if the first corpus data is "这个苹果真好吃", it may be determined, by analysis with the BERT model, that "苹果" in the first corpus data refers to fruit. If the first corpus data is "你的苹果手机好 用吗", it may be determined, by analysis with the BERT model, that "苹果" in the first corpus data refers to an electronic product, or rather, a mobile phone. As such, a character vector corresponding to each character may be determined from the set character-vector mapping table based on the context information of the character, and the real semanteme of each character may be determined in conjunction with the context. As such, the determined character vector is more precise.

In some embodiments, the method further includes: classifying the target eigenvector based on a set classification model, to obtain a classification result.

For example, the target eigenvector may be classified based on a set classifier to obtain a classification result. The classification result characterizes the real semanteme of the target eigenvector, and multiple optional semantemes may be output based on the set classifier. With an example of inputting the target eigenvector into the set classifier and outputting three optional semantemes based on the set classifier, probabilities of the three optional semantemes may be obtained respectively, and the semanteme with the highest probability among the semantemes is taken as a final classification result. For example, if the probability of outputting the first semanteme is 0.2, the probability of outputting the second semanteme is 0.5, and the probability of outputting the third semanteme is 0.3, the second semanteme may be taken as the real semanteme of the target eigenvector, and the classification result is obtained.

For example, if the input target eigenvector characterizes that "我和小红挺好 的", two optional semantemes may be obtained after inputting the target eigenvector into the set classifier. The first semanteme is that I have a good relationship with Xiaohong, and the second semanteme is that both Xiaohong and I are fine. If the probability of outputting the first semanteme through the set classifier is 0.3, and the probability of outputting the second semanteme through the set classifier is 0.7, since the probability of the second semanteme is higher than the probability of the first semanteme, the second semanteme may be determined as the real semanteme of the target eigenvector. That is to say, the real semanteme of the target eigenvector is that both Xiaohong and I are fine. For example, the probability may be obtained by normalizing, based on a softmax function, a numeric value output by the set classifier.

The set classifier may be a classifier built by learning and modelling based on a preprocessed training set (documents with classes known). During implementation, performance test may be performed on the built classifier by utilizing set test documents according to a set test method, and test results are fed back continuously for learning, so as to improve the performance of the classifier.

Figure 2:
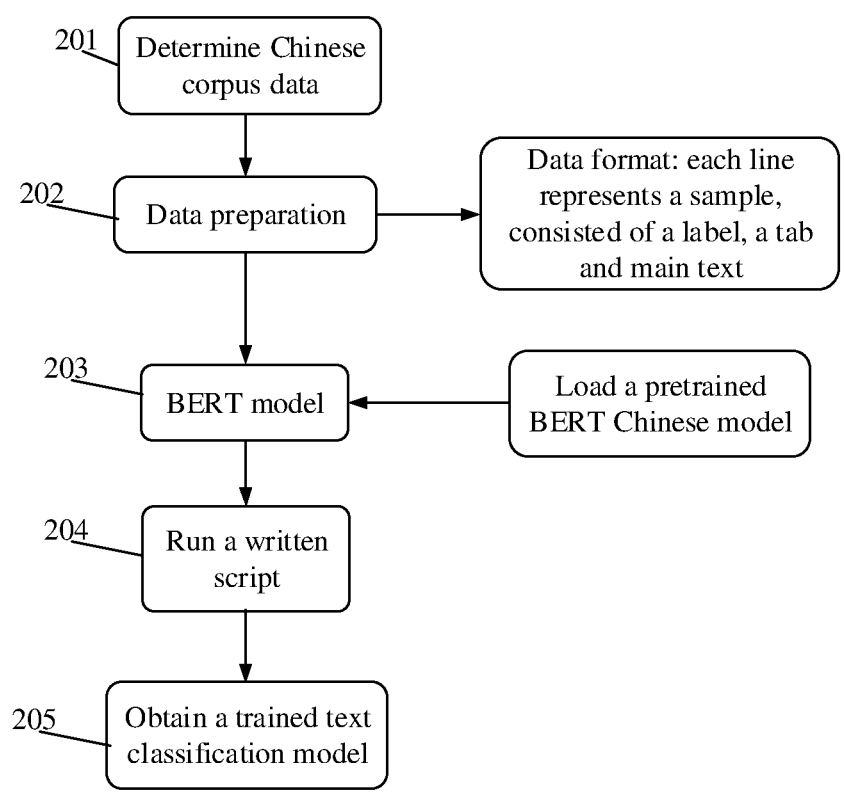
FIG. 2 illustrates a flowchart of a method for processing information according to an exemplary embodiment.

FIG. 2 illustrates a flowchart of a method for processing information according to an exemplary embodiment. As illustrated in FIG. 2, the method includes the following steps.

In step 201, Chinese corpus data is determined.

In an embodiment, multiple BERT models may be pretrained for download. For example, BERT models for different languages and BERT models with different model sizes are pretrained.

In step 202, data is prepared.

In an embodiment, data preparation includes setting a data format and writing an input format class, for example, the input format class may include: a DataProcessor class. The data format may be sorted in the following way: each line represents a sample, and the sample in each line may include a label, a tab and main text. The purpose of writing the DataProcessor class is to use a program to process the data format into a standard input format.

In step 203, a pretrained BERT Chinese model is loaded.

In step 204, a script to run is written, and the written script is run.

In step 205, a trained text classification model is obtained

In an embodiment, the precision of the BERT model may be verified based on a set verification set. When the precision reaches the highest, the training of the model is stopped, and a trained text classification model based on a BERT model is obtained.

Figure 3:
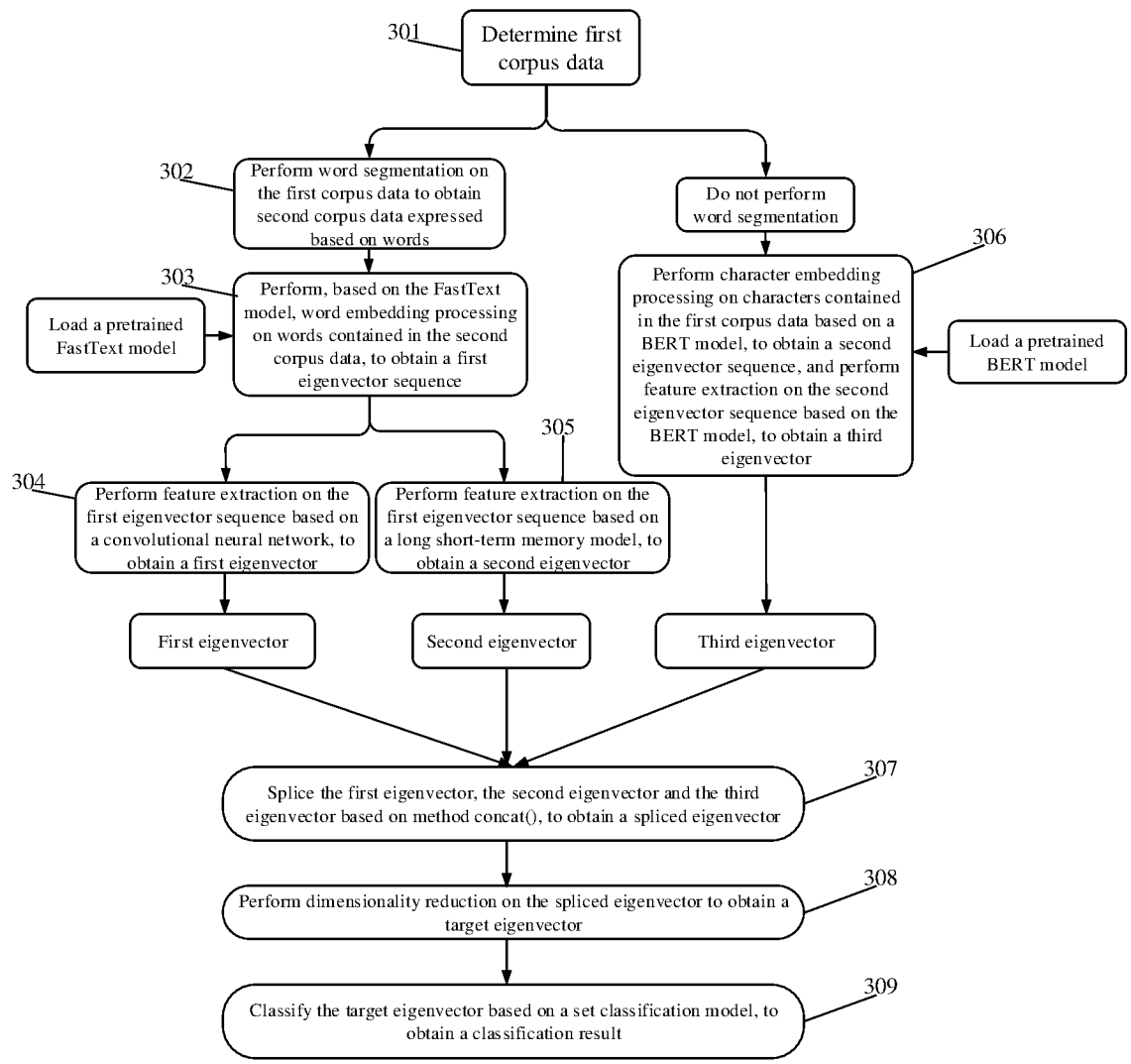
FIG. 3 illustrates a flowchart of a method for processing information according to an exemplary embodiment.

FIG. 3 illustrates a flowchart of a method for processing information according to an exemplary embodiment. As illustrated in FIG. 3, the method includes the following steps.

In step 301, first corpus data is determined.

In an embodiment, the first corpus data includes labelled Chinese corpus data.

In step 302, word segmentation is performed on the first corpus data to obtain second corpus data expressed based on words.

In an embodiment, step 306 is performed without performing word segmentation on the first corpus data.

In step 303, a FastText model is loaded, and word embedding processing is performed, based on the FastText model, on words contained in the second corpus data, to obtain a first eigenvector sequence.

In step 304, feature extraction is performed on the first eigenvector sequence based on a convolutional neural network, to obtain a first eigenvector.

In step 305, feature extraction is performed on the first eigenvector sequence based on a long short-term memory model, to obtain a second eigenvector.

In step 306, character embedding processing is performed on characters contained in the first corpus data based on a BERT model, to obtain a second eigenvector sequence, and feature extraction is performed on the second eigenvector sequence based on the BERT model, to obtain a third eigenvector.

In step 307, the first eigenvector, the second eigenvector, and the third eigenvector are spliced based on a concat( ) method, to obtain a spliced eigenvector.

In step 308, dimensionality reduction is performed on the spliced eigenvector to obtain a target eigenvector.

In step 309, the target eigenvector is classified based on a set classification model, to obtain a classification result.

Embodiments of the disclosure has the following beneficial effects.

In a first aspect, the features of characters and words can be fused. Feature information of words are extracted based on a convolutional neural network model and an LSTM model, and feature information of characters are extracted based on a BERT model. The amount of information for use in classification will be improved through the fusion of the two types of information.

In a second aspect, word vectors of a FastText model are loaded as static word vectors, and character vectors of the BERT model are loaded as dynamic character vectors. Context information is fused in the static word vectors, and features are extracted based on sliding a window, thereby having a good effect in local feature extraction; and the character vectors in the dynamic language model change with the context. In embodiments of the disclosure, by sufficiently fusing the properties of the dynamic character vectors and the static word vectors, the precision and flexibility of information for use in classification can be improved.

In a third aspect, memory information of a long sequence and local information of windows may be fused. The information extracted by the BERT model is the global information of the entire sequence, and is predicted context information, and the BERT model is a discriminant model; and the information extracted by the bidirectional LSTM model is memory information about regression of the sequence, and is an auto-regression model, and the LSTM model is a generative model. The information extracted by the CNN model is local information. Therefore, the memory information of a long sequence and local information of windows are fused by the models.

In embodiments of the disclosure, multiple types of features and multiple feature extraction methods are fused, so that the information acquired for use in classification is more abundant, and the precision and effect of generalization of a model obtained by training are significantly improved. A text classification technique fused with features of characters and words in Chinese text, features of a dynamic language model and a static language model, memory information of a long sequence, and local information of windows is provided, the recall rate and precision of text classification is improved.

Figure 4:
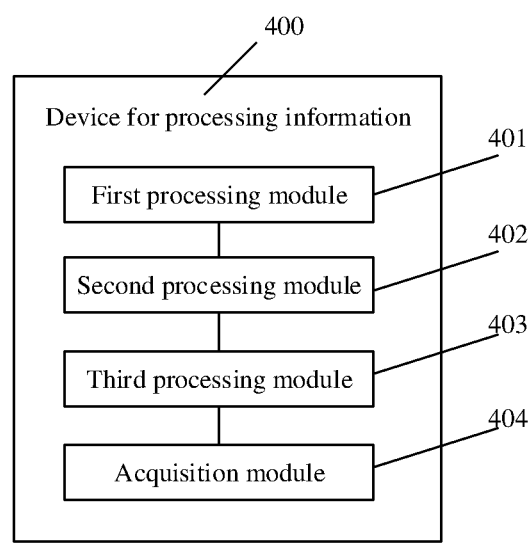
FIG. 4 illustrates a block diagram of a device for processing information according to an exemplary embodiment.

FIG. 4 illustrates a block diagram of a device for processing information according to an exemplary embodiment. As illustrated in FIG. 4, the device 400 for processing information may include a first processing module 401, a second processing module 402, a third processing module 403, and an acquisition module 404.

The first processing module 401 is configured to perform word segmentation on first corpus data to obtain second corpus data containing at least one word.

The second processing module 402 is configured to process, based on a first pretrained model, the at least one word contained in the second corpus data, to obtain a first eigenvector sequence corresponding to the second corpus data.

The third processing module 403 is configured to process, based on a second pretrained model, characters contained in the first corpus data, to obtain a second eigenvector sequence corresponding to the first corpus data.

The acquisition module 404 is configured to obtain a target eigenvector based on the first eigenvector sequence and the second eigenvector sequence.

In some embodiments, each of the first eigenvector sequence and the second eigenvector sequence contains at least one eigenvector, and the acquisition module 404 is further configured to: process, based on a convolutional neural network model, the first eigenvector sequence, to extract a first eigenvector from the first eigenvector sequence; process, based on a long short-term memory model, the first eigenvector sequence, to extract a second eigenvector from the first eigenvector sequence; process, based on the second pretrained model, the second eigenvector sequence, to extract a third eigenvector from the second eigenvector sequence; and obtain the target eigenvector by splicing the first eigenvector, the second eigenvector and the third eigenvector.

In some embodiments, the acquisition module 404 is further configured to: splice the second eigenvector to a tail of the first eigenvector, and splicing the third eigenvector to a tail of the second eigenvector which has been spliced to the tail of the first eigenvector, to obtain a spliced eigenvector; and perform dimensionality reduction on the spliced eigenvector to obtain the target eigenvector.

In some embodiments, the second processing module 402 is further configured to: determine the word ID of each of the at least one word contained in the second corpus data; query, based on the word ID of each of the at least one word, a set word-vector mapping table of the first pretrained model, to determine, from the set word-vector mapping table, an eigenvector for each of the at least one word, with the set word-vector mapping table containing a mapping relationship of the word ID of each of the at least one word with the respective eigenvector; and arrange the determined eigenvectors for all of the at least one word in a first set order, to obtain the first eigenvector sequence.

In some embodiments, the third processing module 403 is further configured to: determine a character ID of each of the characters contained in the first corpus data; analyze, based on the second pretrained model, a context of each of the characters contained in the first corpus data, to obtain an analysis result; query, based on the analysis result for contexts of the characters and character IDs of the characters, a set character-vector mapping table of the second pretrained model, to determine, from the set character-vector mapping table, an eigenvector for each of the characters, with the set character-vector mapping table containing a mapping relationship of the character IDs of the characters with the respective eigenvectors; and arrange the determined eigenvectors for the characters in a second order, to obtain the second eigenvector sequence.

In some embodiments, the device 400 further includes: a classification module, configured to classify the target eigenvector based on a set classification model, to obtain a classification result.

Operations of the modules of the device 400 have been described in detail in the method embodiments, which will not be repeated.

Figure 5:
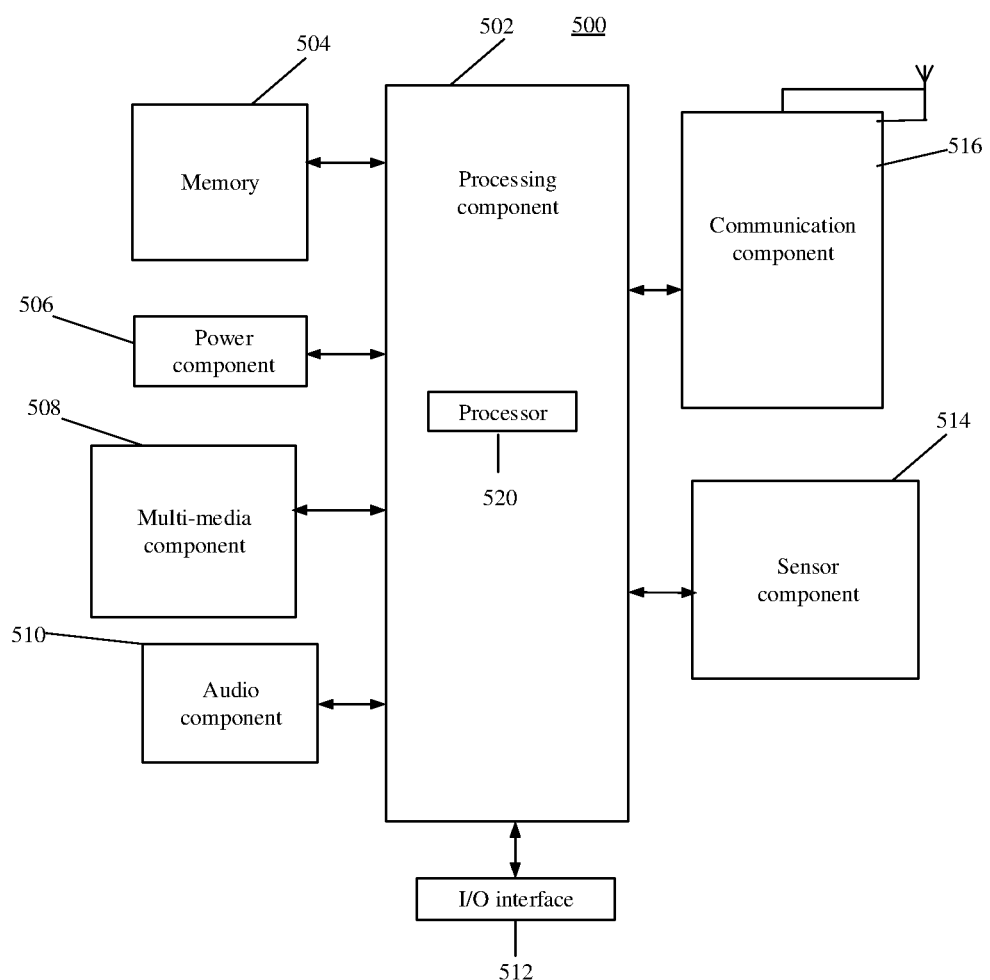
FIG. 5 illustrates a block diagram of a device for processing information according to an exemplary embodiment.

FIG. 5 illustrates a block diagram of a block diagram of a device 500 for processing information according to an exemplary embodiment. For example, the device 500 may be a mobile phone, a computer, a digital broadcast terminal, a message transceiving device, a game console, a tablet device, medical equipment, fitness equipment, a personal digital assistant, etc.

As illustrated in FIG. 5, the device 500 may include one or more of the following: a processing component 502, a memory 504, a power component 506, a multi-media component 508, an audio component 510, an input/output (I/O) interface 512, a sensor component 514, and a communication component 516.

The processing component 502 generally controls the overall operation of the device 500, such as operations associated with display, a phone call, data communication, a camera operation and a recording operation. The processing component 502 may include one or more processors 520 to execute instructions, so as to complete all or some steps in the methods above. In addition, the processing component 502 may include one or more modules for the interaction between the processing component 502 and the other components. For example, the processing component 502 may include a multi-media module for interaction between the multi-media component 508 and the processing component 502.

The memory 504 is configured to store various types of data so as to support operations at the device 500. The examples of these types of data include instructions of any application or method for operating on the device 500, contact person data, phone book data, messages, pictures, video, etc. The memory 504 may be implemented by any type of volatile or non-volatile storage device or a combination of both, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 506 supplies power for the various components of the device 500. The power component 506 may include a power management system, one or more power sources, and other components associated with the generation, management and distribution of power for the device 500.

The multi-media component 508 includes a screen serving as an output interface between the device 500 and a user. In some embodiments, the screen may include a liquid crystal display (LCD) and a touch pad (TP). If the screen includes a touch pad, then the screen may be implemented as a touch screen so as to receive an input signal from the user. The touch pad includes one or more touch sensors to sense touch, slide and gestures on the touch pad. The touch sensor may not only sense the boundaries of touch or slide actions, but also can detect the duration and pressure related to the touch or slide operations. In some embodiments, the multi-media component 508 includes a front camera and/or a rear camera. When the device 500 is in an operating mode, such as a photography mode or a video mode, the front camera and/or the rear camera may receive external multi-media data. Each front camera and rear camera may be a fixed optical lens system or have a focal length or optical zoom capability.

The audio component 510 is configured to output and/or input an audio signal. For example, the audio component 510 includes a microphone (MIC), and when the device 500 is in an operating mode, such as a calling mode, a recording mode and a voice recognition mode, the microphone is configured to receive an external audio signal. The received audio signal can be further stored in the memory 504 or sent via the communication component 516. In some embodiments, the audio component 510 further includes a loudspeaker for output an audio signal.

The I/O interface 512 provides an interface between the processing component 502 and a peripheral interface module, and the above peripheral interface module may be a keyboard, a click wheel, a button, etc. The button may include but is not limited to a home page button, a volume button, a start button and a locking button.

The sensor component 514 includes one or more sensors for providing state evaluation for the device 500 from various aspects. For example, the sensor component 514 may detect an on/off state of the device 500, and the relative positioning between components; for example the components are a display and keyboard of the device 500. The sensor component 514 may also detect a positional change of the device 500 or a component of the device 500, whether there is contact between a user and the battery charging apparatus 500, the orientation or acceleration/deceleration of the device 500, and a temperature change of the device 500. The sensor component 514 may include a proximity sensor configured to detect the existence of an object nearby without any physical contact. The sensor component 514 may also include an optical sensor, such as a CMOS or CCD image sensor, for use in an imaging application. In some embodiments, the sensor component 514 may also include an acceleration sensor, a gyroscope sensor, a magnetic sensor, a pressure sensor or a temperature sensor.

The communication component 516 is configured for wired or wireless communication between the device 500 and another device. The device 500 may access a communication standard based wireless network, such as WiFi, 4G, 5G or a combination thereof. In an exemplary embodiment, the communication component 516 receives a broadcast signal from an external broadcast management system or broadcasts relevant information through a broadcast channel In an exemplary embodiment, the communication component 516 further includes a near-field communication (NFC) module for short-range communication. In an exemplary embodiment, the communication component 516 may be implemented based on the radio-frequency identification (RFID) technique, the infrared data association (IrDA) technique, the ultra-wide band (UWB) technique, the Bluetooth (BT) technique, etc.

In an exemplary embodiment, the device 500 may be implemented by one or more of an application-specific integrated circuit (ASIC), a digital signal processor (DSP), a digital signal processing device (DSPD), a programmable logic device (PLD), a field programmable gate array (FPGA), a controller, a micro-controller, a micro-processor or other electronic elements, for executing the above methods.

In an exemplary embodiment, a non-transitory computer-readable storage medium including instructions is also provided, for example a memory 504 including instructions. The above instructions may be executed by the processor 520 of the device 500 to perform the above methods. For example, the non-transitory computer-readable storage medium may be a ROM, a random access memory (RAM), a CD-ROM, a magnetic tape, a floppy disk, an optical data storage device and so on. Also for example, the instructions in the storage medium, when executed by a processor of a device, may cause the device to perform a method for processing information. The method includes: performing word segmentation on the first corpus data to obtain the second corpus data expressed based on words; processing, based on a first pretrained model, the words contained in the second corpus data, to obtain a first eigenvector sequence corresponding to the second corpus data; processing, based on a second pretrained model, characters contained in the first corpus data, to obtain a second eigenvector sequence corresponding to the first corpus data; and obtaining a target eigenvector based on the first eigenvector sequence and the second eigenvector sequence.

Figure 6:
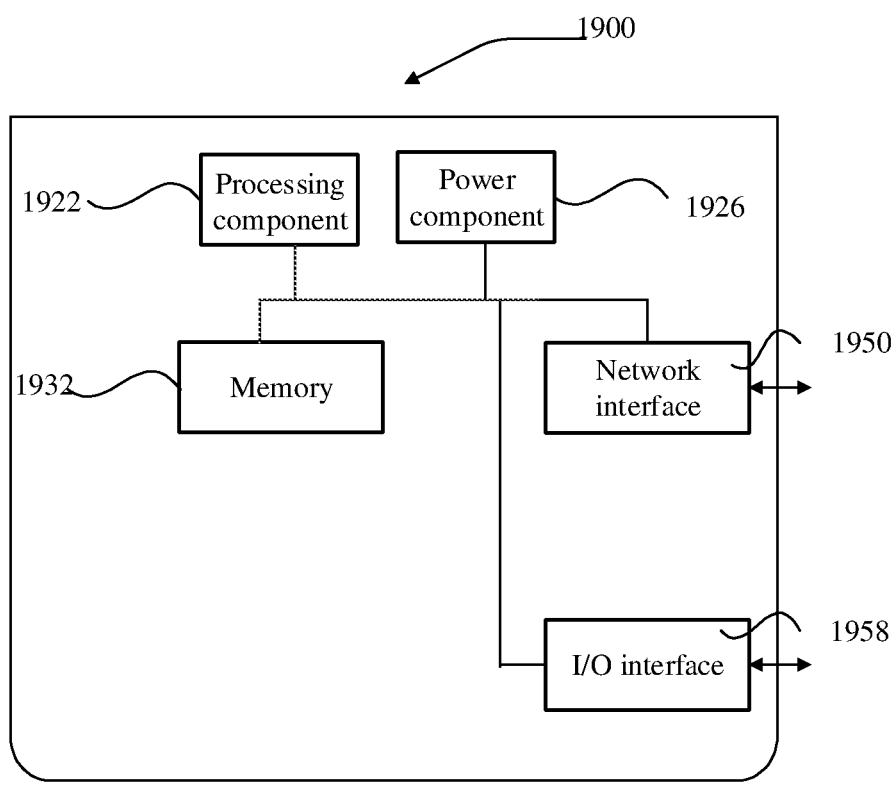
FIG. 6 illustrates a block diagram of a device for processing information according to an exemplary embodiment.

FIG. 6 illustrates a block diagram of a device 1900 for processing information according to an exemplary embodiment. For example, the device 1900 may be provided as a server. As illustrates in FIG. 6, the server 1900 includes a processing component 1922 which further includes one or more processors; and a memory resource represented by a memory 1932, for storing instructions executable by the processing component 1922, for example an application program. The application program stored in the memory 1932 may include one or more modules, each corresponding to a set of instructions. Additionally, the processing component 1922 is configured to execute instructions, so as to perform the method for processing information. The method includes: performing word segmentation on the first corpus data to obtain the second corpus data expressed based on words; processing, based on a first pretrained model, the words contained in the second corpus data, to obtain a first eigenvector sequence corresponding to the second corpus data; processing, based on a second pretrained model, characters contained in the first corpus data, to obtain a second eigenvector sequence corresponding to the first corpus data; and obtaining a target eigenvector based on the first eigenvector sequence and the second eigenvector sequence.

The server 1900 may further include: a power component 1926 configured to perform power management for the server 1900; a wired or wireless network interface 1950 configured to connect the server 1900 to a network; and an input/output (I/O) interface 1958. The server 1900 may operate based on an operating system stored in the memory 1932, for example Windows Server™, Mac OS X™, Unix™, Linux™ or FreeBSD™.

Other embodiments of the disclosure would readily occur to those skilled in the art when considering the specification and practicing the disclosure here. The disclosure is aimed at covering any variants, usages or adaptive changes that comply with generic principles of the disclosure and include common knowledge or customary technical means in the art that is not described in the disclosure. The specification and embodiments are merely considered exemplary, and the true scope and spirit of the disclosure are specified by the appended claims.

It should be understood that the disclosure is not limited to the precise structures described above and illustrated in the accompanying drawings, and modifications and changes may be made thereto without departing from the scope thereof. The scope of the disclosure is defined by the appended claims.

What is claimed is:

1. A method for processing information, comprising:
performing word segmentation on first corpus data to obtain second corpus data containing at least one word;
processing, based on a first pretrained model, the at least one word contained in the second corpus data, to obtain a first eigenvector sequence corresponding to the second corpus data;
processing, based on a second pretrained model, characters contained in the first corpus data, to obtain a second eigenvector sequence corresponding to the first corpus data; and
obtaining a target eigenvector based on the first eigenvector sequence and the second eigenvector sequence,
wherein each of the at least one word contained in the second corpus data has a word identification (ID), and processing, based on the first pretrained model, the at least one word contained in the second corpus data, to obtain the first eigenvector sequence corresponding to the second corpus data comprises:
determining the word ID of each of the at least one word contained in the second corpus data;
querying, based on the word ID of each of the at least one word, a set word-vector mapping table of the first pretrained model, to determine, from the set word-vector mapping table, an eigenvector for each of the at least one word, wherein the set word-vector mapping table contains a mapping relationship of the word ID of each of the at least one word with the respective eigenvector; and
arranging the determined eigenvectors for all of the at least one word in a first set order, to obtain the first eigenvector sequence, or
wherein each of the characters contained in the first corpus data has a character identification (ID), and processing, based on the second pretrained model, the characters contained in the first corpus data, to obtain the second eigenvector sequence corresponding to the first corpus data comprises:
determining a character ID of each of the characters contained in the first corpus data;
analyzing, based on the second pretrained model, a context of each of the characters contained in the first corpus data, to obtain an analysis result;
querying, based on the analysis result for contexts of the characters and character IDs of the characters, a set character-vector mapping table of the second pretrained model, to determine, from the set character-vector mapping table, an eigenvector for each of the characters, wherein the set character-vector mapping table contains a mapping relationship of the character IDs of the characters with the respective eigenvectors; and
arranging the determined eigenvectors for the characters in a second order, to obtain the second eigenvector sequence.

2. The method according to claim 1, wherein each of the first eigenvector sequence and the second eigenvector sequence contains at least one eigenvector, and the obtaining the target eigenvector based on the first eigenvector sequence and the second eigenvector sequence comprises:

processing, based on a convolutional neural network model, the first eigenvector sequence, to extract a first eigenvector from the first eigenvector sequence;

processing, based on a long short-term memory model, the first eigenvector sequence, to extract a second eigenvector from the first eigenvector sequence;

processing, based on the second pretrained model, the second eigenvector sequence, to extract a third eigenvector from the second eigenvector sequence; and obtaining the target eigenvector by splicing the first eigenvector, the second eigenvector, and the third eigenvector.

3. The method according to claim 2, wherein the obtaining the target eigenvector by splicing the first eigenvector, the second eigenvector, and the third eigenvector comprises:

splicing the second eigenvector to a tail of the first eigenvector, and splicing the third eigenvector to a tail of the second eigenvector which has been spliced to the tail of the first eigenvector, to obtain a spliced eigenvector; and performing dimensionality reduction on the spliced eigenvector to obtain the target eigenvector.

4. The method according to claim 1, further comprising: classifying the target eigenvector based on a set classification model, to obtain a classification result.

5. A device for processing information, comprising:
a processor, and
a memory for storing instructions executable by the processor,
wherein the processor is configured to:
perform word segmentation on first corpus data to obtain second corpus data containing at least one word;
process, based on a first pretrained model, the at least one word contained in the second corpus data, to obtain a first eigenvector sequence corresponding to the second corpus data;
process, based on a second pretrained model, characters contained in the first corpus data, to obtain a second eigenvector sequence corresponding to the first corpus data; and
obtain a target eigenvector based on the first eigenvector sequence and the second eigenvector sequence,
wherein each of the at least one word contained in the second corpus data has a word identification (ID), and
processing, based on the first pretrained model, the at least one word contained in the second corpus data, to obtain the first eigenvector sequence corresponding to the second corpus data comprises:
determining the word ID of each of the at least one word contained in the second corpus data;
querying, based on the word ID of each of the at least one word, a set word-vector mapping table of the first pretrained model, to determine, from the set word-vector mapping table, an eigenvector for each of the at least one word, wherein the set word-vector mapping table contains a mapping relationship of the word ID of each of the at least one word with the respective eigenvector; and
arranging the determined eigenvectors for all of the at least one word in a first set order, to obtain the first eigenvector sequence, or
wherein each of the characters contained in the first corpus data has a character identification (ID), and processing, based on the second pretrained model, the characters contained in the first corpus data, to obtain the second eigenvector sequence corresponding to the first corpus data comprises:

determining a character ID of each of the characters contained in the first corpus data;
analyzing, based on the second pretrained model, a context of each of the characters contained in the first corpus data, to obtain an analysis result;
querying, based on the analysis result for contexts of the characters and character IDs of the characters, a set character-vector mapping table of the second pretrained model, to determine, from the set character-vector mapping table, an eigenvector for each of the characters, wherein the set character-vector mapping table contains a mapping relationship of the character IDs of the characters with the respective eigenvectors; and
arranging the determined eigenvectors for the characters in a second order, to obtain the second eigenvector sequence.

6. The device according to claim 5, wherein each of the first eigenvector sequence and the second eigenvector sequence contains at least one eigenvector, and in obtaining the target eigenvector based on the first eigenvector sequence and the second eigenvector sequence further, the processor is further configured to:

process, based on a convolutional neural network model, the first eigenvector sequence, to extract a first eigenvector from the first eigenvector sequence;
process, based on a long short-term memory model, the first eigenvector sequence, to extract a second eigenvector from the first eigenvector sequence;
process, based on the second pretrained model, the second eigenvector sequence, to extract a third eigenvector from the second eigenvector sequence; and
obtain the target eigenvector by splicing the first eigenvector, the second eigenvector, and the third eigenvector.

7. The device according to claim 6, wherein in obtaining the target eigenvector by splicing the first eigenvector, the second eigenvector, and the third eigenvector, the processor is further configured to:

splice the second eigenvector to a tail of the first eigenvector, and splice the third eigenvector to a tail of the second eigenvector which has been spliced to the tail of the first eigenvector, to obtain a spliced eigenvector; and
perform dimensionality reduction on the spliced eigenvector to obtain the target eigenvector.

8. The device according to claim 5, wherein the processor is further configured to:
classify the target eigenvector based on a set classification model, to obtain a classification result.

9. A non-transitory computer-readable storage medium having stored therein instructions that, when executed by a processor of a device, cause the device to perform a method for processing information, the method comprising:

performing word segmentation on first corpus data to obtain second corpus data containing at least one word;
processing, based on a first pretrained model, the at least one word contained in the second corpus data, to obtain a first eigenvector sequence corresponding to the second corpus data;
processing, based on a second pretrained model, characters contained in the first corpus data, to obtain a second eigenvector sequence corresponding to the first corpus data;
and
obtaining a target eigenvector based on the first eigenvector sequence and the second eigenvector sequence, wherein each of the at least one word contained in the second corpus data has a word identification (ID), and processing, based on the first pretrained model, the at least one word contained in the second corpus data, to obtain the first eigenvector sequence corresponding to the second corpus data comprises:
 determining the word ID of each of the at least one word contained in the second corpus data;
 querying, based on the word ID of each of the at least one word, a set word-vector mapping table of the first pretrained model, to determine, from the set word-vector mapping table, an eigenvector for each of the at least one word, wherein the set word-vector mapping table contains a mapping relationship of the word ID of each of the at least one word with the respective eigenvector; and
 arranging the determined eigenvectors for all of the at least one word in a first set order, to obtain the first eigenvector sequence, or
wherein each of the characters contained in the first corpus data has a character identification (ID), and processing, based on the second pretrained model, the characters contained in the first corpus data, to obtain the second eigenvector sequence corresponding to the first corpus data comprises:
 determining a character ID of each of the characters contained in the first corpus data;
 analyzing, based on the second pretrained model, a context of each of the characters contained in the first corpus data, to obtain an analysis result;
 querying, based on the analysis result for contexts of the characters and character IDs of the characters, a set character-vector mapping table of the second pretrained model, to determine, from the set character-vector mapping table, an eigenvector for each of the characters, wherein the set character-vector mapping table contains a mapping relationship of the character IDs of the characters with the respective eigenvectors; and arranging the determined eigenvectors for the characters in a second order, to obtain the second eigenvector sequence.

10. The non-transitory computer-readable storage medium according to claim 9, wherein each of the first eigenvector sequence and the second eigenvector sequence contains at least one eigenvector, and the obtaining the target eigenvector based on the first eigenvector sequence and the second eigenvector sequence comprises:
 processing, based on a convolutional neural network model, the first eigenvector sequence, to extract a first eigenvector from the first eigenvector sequence;
 processing, based on a long short-term memory model, the first eigenvector sequence, to extract a second eigenvector from the first eigenvector sequence;
 processing, based on the second pretrained model, the second eigenvector sequence, to extract a third eigenvector from the second eigenvector sequence; and
 obtaining the target eigenvector by splicing the first eigenvector, the second eigenvector and the third eigenvector.

11. The non-transitory computer-readable storage medium according to claim 10, wherein the obtaining the target eigenvector by splicing the first eigenvector, the second eigenvector and the third eigenvector comprises:
 splicing the second eigenvector to a tail of the first eigenvector, and splicing the third eigenvector to a tail of the second eigenvector which has been spliced to the tail of the first eigenvector, to obtain a spliced eigenvector; and
 performing dimensionality reduction on the spliced eigenvector to obtain the target eigenvector.

12. The non-transitory computer-readable storage medium according to claim 9, wherein the method further comprises:
 classifying the target eigenvector based on a set classification model, to obtain a classification result.

* * * * *